(12) United States Patent
Celik

(10) Patent No.: US 10,150,334 B2
(45) Date of Patent: Dec. 11, 2018

(54) NON-PNEUMATIC SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 162 days.

(21) Appl. No.: 15/351,717

(22) Filed: Nov. 15, 2016

(65) Prior Publication Data

US 2018/0134071 A1    May 17, 2018

(51) Int. Cl.

| | |
|---|---|
| *B60B 9/10* | (2006.01) |
| *B60C 7/14* | (2006.01) |
| *B60B 9/26* | (2006.01) |
| *B60C 7/10* | (2006.01) |
| *B60C 7/12* | (2006.01) |
| *B60C 7/00* | (2006.01) |

(52) U.S. Cl.
CPC .................. *B60B 9/10* (2013.01); *B60B 9/26* (2013.01); *B60C 7/10* (2013.01); *B60C 7/105* (2013.01); *B60C 7/125* (2013.01); *B60C 7/14* (2013.01); *B60B 2360/30* (2013.01); *B60B 2360/50* (2013.01); *B60B 2900/321* (2013.01); *B60B 2900/551* (2013.01); *B60B 2900/711* (2013.01); *B60C 2007/005* (2013.01); *B60C 2007/107* (2013.01); *B60C 2007/146* (2013.01)

(58) Field of Classification Search
CPC .... B60B 9/10; B60B 9/12; B60B 9/26; B60C 7/10; B60C 7/102; B60C 7/14; B60C 2007/146

See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |

(Continued)

FOREIGN PATENT DOCUMENTS

| | | |
|---|---|---|
| JP | 2011219009 A | 11/2011 |
| JP | 2011246049 A | 12/2011 |

(Continued)

OTHER PUBLICATIONS

European Search Report dated Feb. 7, 2018 for Application Serial No. EP17199927.

*Primary Examiner* — Jason R Bellinger
(74) *Attorney, Agent, or Firm* — Robert N. Lipcsik

(57) ABSTRACT

A wheel and tire assembly in accordance with the present invention for a mobile vehicle includes an inner central hub, an outer shear band and tread structure mounted on the central hub, and a spoke structure extending between the central hub and the shear band and tread structure. The spoke structure defines a plurality of cavities disposed concentrically about the central hub whereby the cavities allow the spoke structure to deflect under load.

6 Claims, 3 Drawing Sheets

(56) References Cited

U.S. PATENT DOCUMENTS

| | | |
|---|---|---|
| 4,602,823 A | 7/1986 | Berg |
| 5,343,916 A | 9/1994 | Duddey |
| 5,800,643 A | 9/1998 | Frankowski |
| 6,068,721 A | 5/2000 | Dyer |
| 6,260,598 B1 | 7/2001 | Tanaka |
| 8,962,120 B2 | 2/2015 | Delfino |
| 2004/0069385 A1 | 4/2004 | Timoney |
| 2010/0193097 A1 | 8/2010 | McNier |
| 2010/0200131 A1 | 8/2010 | Masanori |
| 2011/0024008 A1 | 2/2011 | Manesh |
| 2015/0174954 A1 | 6/2015 | Asper |
| 2018/0134083 A1* | 5/2018 | Celik ................... B60C 7/14 |

FOREIGN PATENT DOCUMENTS

| | | |
|---|---|---|
| KR | 20120063616 A | 6/2012 |
| KR | 20130073112 A | 7/2013 |

* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel and tire assembly in accordance with the present invention for a mobile vehicle includes an inner central hub, an outer shear band and tread structure mounted on the central hub, and a spoke structure extending between the central hub and the shear band and tread structure. The spoke structure defines a plurality of cavities disposed concentrically about the central hub whereby the cavities allow the spoke structure to deflect under load.

According to another aspect of the assembly, the spoke structure comprises a polymer material.

According to still another aspect of the assembly, the spoke structure comprises a homogenous polymer material.

According to yet another aspect of the assembly, each cavity has a common cross sectional profile about an axis of rotation of the assembly.

According to still another aspect of the assembly, each cavity has a common axial length equal to a uniform axial thickness of the spoke structure.

According to yet another aspect of the assembly, the assembly further comprises a reinforcing membrane interlaced circumferentially and radially about the cavities for further tuning the flexibility/stiffness of the spoke structure.

According to still another aspect of the assembly, the spoke structure comprises a uniform rubber material.

A method in accordance with the present invention non-pneumatically supports a mobile vehicle. The method includes the steps of: rotating a central inner hub about a horizontal axis; mounting the central hub on to an outer ring structure; extending a spoke structure axially and radially between the central hub and the flexible rim; defining a plurality of axially extending cavities in the spoke structure concentrically about the central hub; and vertically loading the spoke structure such that part of the spoke structure deflects vertically.

According to another aspect of the method, the spoke structure comprises a polymer material.

According to still another aspect of the method, the spoke structure comprises a homogenous polymer material.

According to yet another aspect of the method, each cavity has a common cross sectional shape relative to the horizontal axis.

According to still another aspect of the method, each cavity has a common axial length equal to a uniform axial thickness of the spoke structure.

According to yet another aspect of the method, a further step interlaces a reinforcing membrane circumferentially and radially about the cavities for further tuning the flexibility/stiffness of the spoke structure.

According to still another aspect of the method, further steps tune the flexibility/stiffness of the spoke structure and interlace a reinforcing membrane circumferentially and radially about the cavities.

According to yet another aspect of the method, the spoke structure comprises a uniform rubber material.

According to still another aspect of the method, a further step buckles a shaft at a predetermined load on the spoke structure.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel, such as that described in US 2004/0069385, incorporated herein by reference in its entirety, may have an outer rim flexibly connected to a central hub by means of lightweight composite springs. The springs may be plates fixed to the rim and to the hub. The hub may contain a speed reduction gear unit and/or an electric motor and may have a suspension mechanism for connecting a vehicle chassis to each wheel. The rim may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material.

Another conventional wheel may have a rubber strip with a molded tread bonded to a composite rim for improved grip. Further, the springs interconnecting the rim and hub may be S-shaped lightweight composite springs.

Still another conventional wheel may have a rim connected to a hub by means of a plurality of S-shaped springs. Each spring may have an inner end attached to the hub and an outer end attached to the rim. A different construction of rubber strip with molded tread may extend about an exterior of the rim.

Yet another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps. The assembly may further have a limit stop disc mounted on the central hub, coaxial with the central hub, and disposed radially outward from the central hub. An outer peripheral edge of the stop disc may be disposed spaced-apart and radially inward from an inner face of the circular rim for engagement with the circular rim upon radially inward flexing of the circular rim by a preset distance.

Figure 1:
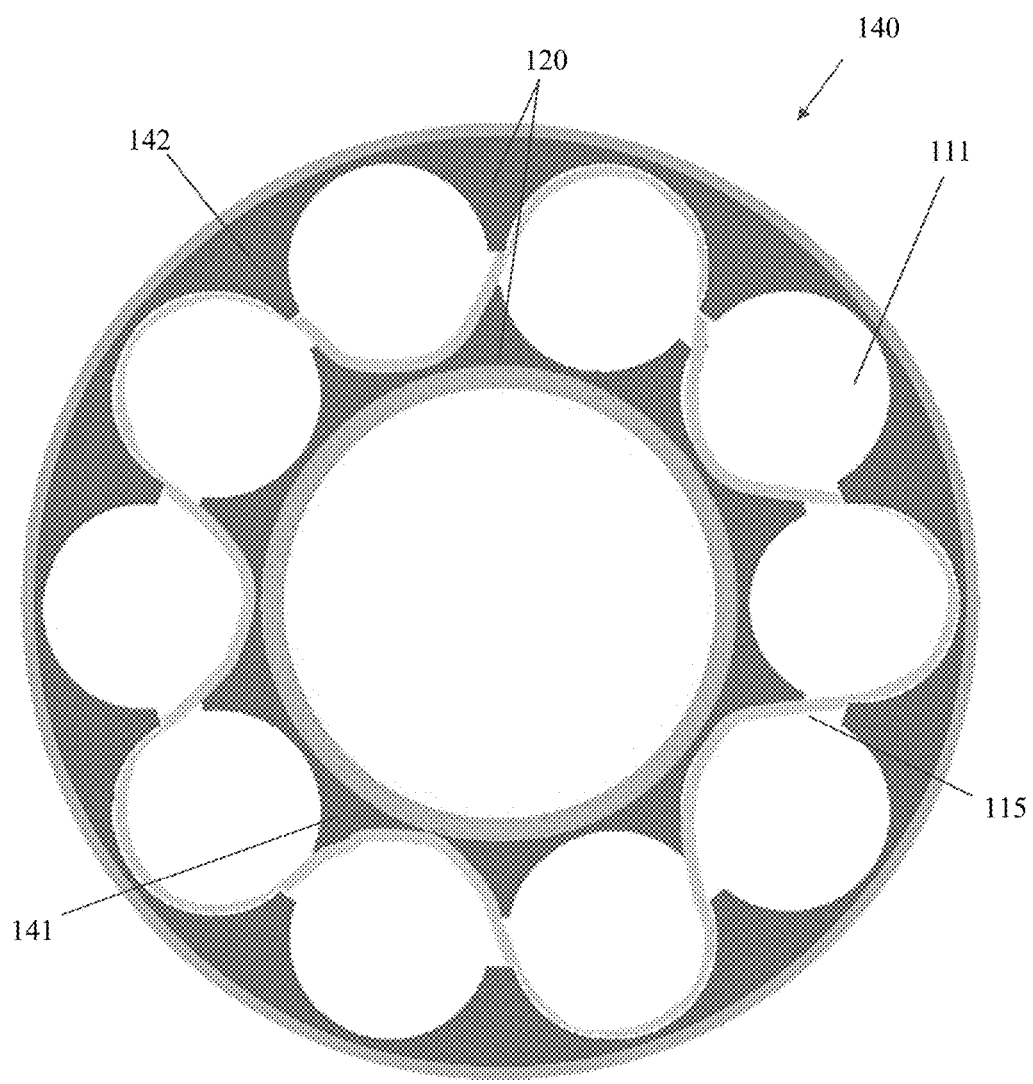
FIG. 1 is a schematic side view of an example assembly in accordance with the present invention.

As shown in FIG. 1, an example wheel/tire assembly 140 in accordance with the present invention may be formed from a lightweight polymer material, such as, for example, a standard tire rubber compound 120 or other polymer. The assembly 140 may have an extruded cylindrical inner profile 141 and an extruded cylindrical outer profile 142, or spoke structure, which may include a shear band and tread structure.

The inner and outer profiles 141, 142 may together define cylindrical cavities 111 disposed concentrically about the inner profile 141 allowing the configuration to deflect under load thereby defining a suitable balance between 1) flexibility for ride comfort and traction within a footprint of the assembly 140 and 2) stiffness for vehicle handling, low rolling resistance, and low heat build-up of the assembly 140. The cylindrical cavities 111 may further reduce assembly weight while the cylindrical shape of the cavities may maintain essentially homogenous and uniform pressure distribution within the inner and outer profiles 141, 142. The dimensions and number of the cylindrical cavities 111 may be varied or made uniform for further tuning of the flexibility/stiffness of the assembly 140.

The assembly 140 of FIG. 1 may further include a reinforcing membrane 115 interlaced circumferentially and radially about the cylindrical cavities 111 for further securing the inner profile 141 to the outer profile 142 and further tuning the flexibility/stiffness of the assembly 140. The membrane 115 may be constructed of a metal, polymer, composite, and/or other suitable material for further refining the operating parameters of the assembly 140. The dimensions and number of layers of the membrane 115 may be varied or made uniform for further tuning of the flexibility/stiffness of the assembly 140.

Figure 2:
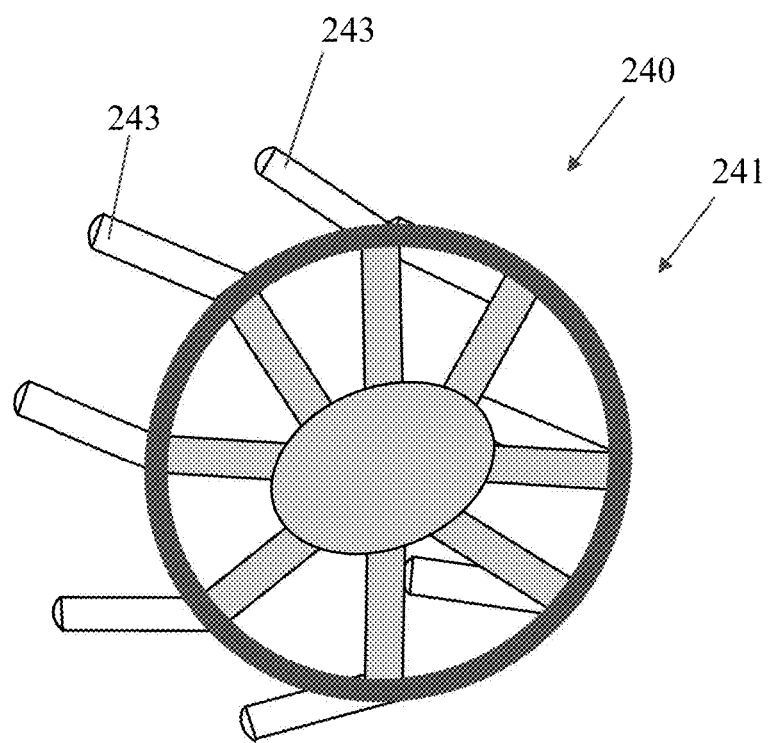
FIG. 2 is a schematic perspective view of part of the example assembly of FIG. 1.
Figure 3:
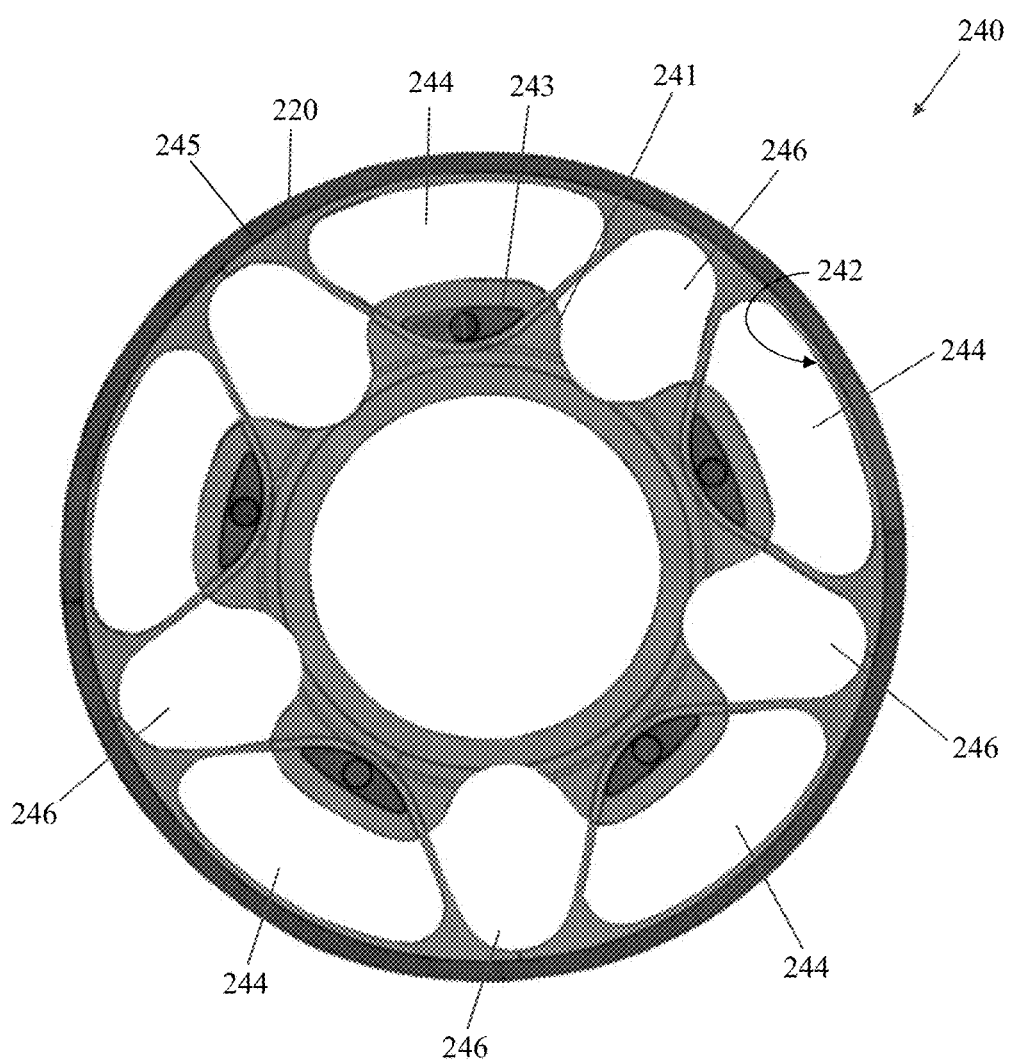
FIG. 3 is a schematic side view of still another example assembly in accordance with the present invention.

As shown in FIGS. 2 & 3, another example wheel/tire assembly 240 in accordance with the present invention may be formed from a lightweight polymer material, such as, for example, a standard tire rubber compound 220 or other polymer. The assembly 240 may have a cylindrical central hub 241 and a circular outer flexible rim 242, or spoke structure, mounted on the central hub 241 by axially extending projections 243 of the central hub. Another ring structure (not shown) may secure the outer ends of the projections 243 once the projections are inserted through triangular cavities 244 of the rim 242 thereby securing the central hub 241 to the rim. The rim 242 may further include a shear band and tread structure 245 at a radially outer surface of the rim.

As shown in FIG. 3, the rim 242 may include triangular cavities 244 and secondary cavities 246 for further reducing weight and distributing stresses throughout the rim. The rim 242 may be formed by extrusion, resin transfer molding, injection molding, and/or compression molding of a standard tire compound 220. Fabric reinforcement may also be added to the rim 242 for added strength. A tread may be secured to the assembly 240 by adhesive or other suitable method.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel and tire assembly for a mobile vehicle comprising:
   an inner central hub;
   an outer shear band and tread structure mounted on the central hub;
   a spoke structure extending between the central hub and the shear band and tread structure, the spoke structure defining a plurality of cavities disposed concentrically about the central hub whereby the cavities allow the spoke structure to deflect under load; and
   a reinforcing membrane interlaced circumferentially and radially about the cavities for further tuning the flexibility of the spoke structure.

2. The wheel and tire assembly as set forth in claim 1 wherein the spoke structure comprises a polymer material.

3. The wheel and tire assembly as set forth in claim 1 wherein the spoke structure comprises a homogenous polymer material.

4. The wheel and tire assembly as set forth in claim 1 wherein each cavity has a common cross sectional profile about an axis of rotation of the assembly.

5. The wheel and tire assembly as set forth in claim 1 wherein each cavity has a common axial length equal to a uniform axial thickness of the spoke structure.

6. The wheel and tire assembly as set forth in claim 1 wherein the spoke structure comprises a uniform rubber material.

* * * * *